United States Patent [19]

Moor

[11] Patent Number: 5,513,562
[45] Date of Patent: May 7, 1996

[54] NON-STICK GARLIC PRESS WITH INTEGRATED CLEANER

[75] Inventor: Roland Moor, Lyss, Switzerland

[73] Assignee: Zyliss U.S.A Corp., Rancho Santa Margarita, Calif.

[21] Appl. No.: 519,306

[22] Filed: Aug. 25, 1995

[51] Int. Cl.⁶ .............................. B30B 7/00; B30B 9/00; B30B 9/02; B30B 15/00

[52] U.S. Cl. .............................. 100/112; 99/495; 99/506; 100/125; 100/234; 15/236.08; D7/666

[58] Field of Search .............................. 99/495–497, 458, 99/460, 506; 100/112, 125, 233, 234, 243, 132, 116, 902, 99; 15/236.05, 236.08, 105, 246; D7/665, 666

[56] References Cited

U.S. PATENT DOCUMENTS

| 253,353 | 2/1882 | Dean | 100/234 |
|---|---|---|---|
| 683,347 | 9/1901 | Smith | 100/234 |
| 1,026,670 | 5/1912 | Goodnow | 100/234 |
| 1,054,731 | 3/1913 | Williams | 100/234 |
| 3,580,168 | 5/1971 | Zyssett | 100/234 |
| 4,069,752 | 1/1978 | Ahner | 100/112 |
| 4,466,346 | 8/1984 | Gemelli | 99/495 |
| 4,545,299 | 10/1985 | Ahner | 99/495 |
| 5,101,720 | 4/1992 | Bianchi | 99/506 |
| 5,163,362 | 11/1992 | Gaber et al. | 99/458 |
| 5,165,335 | 11/1992 | Bainchi | 15/236.08 |
| 5,370,044 | 12/1994 | Lackie | 99/495 |

*Primary Examiner*—Timothy F. Simone
*Attorney, Agent, or Firm*—Brown, Martin, Haller & McClain

[57] ABSTRACT

A garlic press is disclosed with includes an enameled coating of a low friction material, preferably PTFE, on the inside surface and holes of the press chamber in a smooth, even layer, with excellent adhesion to the underlying surface, and with an integrated cleaning tool which is retained with the press at all times while the press is being used, but which can be easily and quickly separated from the press for cleaning crushed garlic clove residue from the press.

14 Claims, 2 Drawing Sheets

NON-STICK GARLIC PRESS WITH INTEGRATED CLEANER

BACKGROUND OF THE INVENTION

1. Field of the Invention

The invention herein relates to kitchen and cooking utensils. More particularly it relates to garlic presses.

2. Description of the Prior Art

The garlic press is a common and widely used utensil in more home and restaurant kitchens. Notwithstanding that the basic design has long been known, certain problems remain.

First, the clove of garlic should be able to be pressed cleanly and smoothly, so that the liquid is expressed from the clove by crushing rather than by tearing the clove apart. Torn portions of clove impede the travel of the press plate in the clove crushing chamber and may prevent full expression of the liquid. Further, once the clove has been crushed and the liquid extracted, the residue should be easily removable from the device. Some prior art presses have had a low-friction composition applied to the interior surfaces of the press chamber to improve the crushing and removal of the clove. However, the prior art coatings have been difficult to apply, especially to apply evenly, and do not adhere to the interior of the press as well as has been desired.

Second, during crushing it is common for bits of garlic to be forced into or through the sieve holes at the bottom of the chamber. Even after the bulk of the residue of a crushed clove has been removed from the press, these bits of the crushed clove will remain lodged in the sieve holes and must be separately removed. Removal, however, must not damage or enlarge the sieve holes, since their size is specifically designed to allow passage of the expressed liquid but to bar passage of substantially all of the crushed garlic clove. Cleaners have been designed in the past with prongs to be pushed upwardly through the holes from the exit side of the sieve to dislodge any garlic particles into the press chamber, from which they can be rinsed away. Such cleaning devices, however, have been separate from the press itself, which means that they often gets lost or at least are difficult or inconvenient to find at the time that the chef needs to clean a garlic press.

It is impractical for a cleaner to be attached to a press by some sort of tether. The latter merely interferes with the convenient use of the press, and will quickly be removed and discarded by the user. Other possible solutions, such as a cleaner pivoted on the press produces significant mechanical problems, which have not been overcome in a manner which still allows economical production and sale of such a press.

It would therefore be of value to have a press which permits smooth and easy pressing of a clove and removal of the residue, including easy cleaning of the sieve holes, after use. It would also be of value to have a cleaner with a structure such that is can simply and reliably clean any residue caught in sieve holes and can be easily and conveniently stowed within the press itself where it remains readily available but does not interfere in any manner with the use of the press.

SUMMARY OF THE INVENTION

The invention described herein overcomes those problems of the prior art devices. The coating is enameled onto the inside surface of the press chamber, including into the discharge holes, in a smooth, even layer, with excellent adhesion to the underlying metal surface. The cleaning tool has a unique structure which allows it to be fully integrated with the press at all times while the press is being used, but then be easily and quickly separated from the press for cleaning of the discharge holes in the press.

In its principal embodiment, the invention herein is a garlic press comprising an elongated handle having a drainable press chamber at an end thereto, the press chamber having a top opening, a bottom and an inner surface, a press plate retractably moveable into the press chamber, lever means acting on a fulcrum at the end for retractably urging the press plate into the press chamber through the top opening, the press plated being joined to the lever by a pivot, a low surface friction material enameled onto the inner surface of the press chamber, and a cleaner mounted on the lever and removably secured thereto by interaction with the pivot, whereby when a clove of garlic is placed in the press chamber, its contained liquid can be extracted by the clove being cleanly crushed by the press plated being urged into the chamber by the lever, liquid so expressed drains from the chamber and following the crushing and liquid expression the cleaner can be demounted from the lever and used to dislodge debris of the crushed clove.

DETAILED DESCRIPTION AND PREFERRED EMBODIMENTS

The invention herein is best understood by reference to the drawings.

Figure 1:
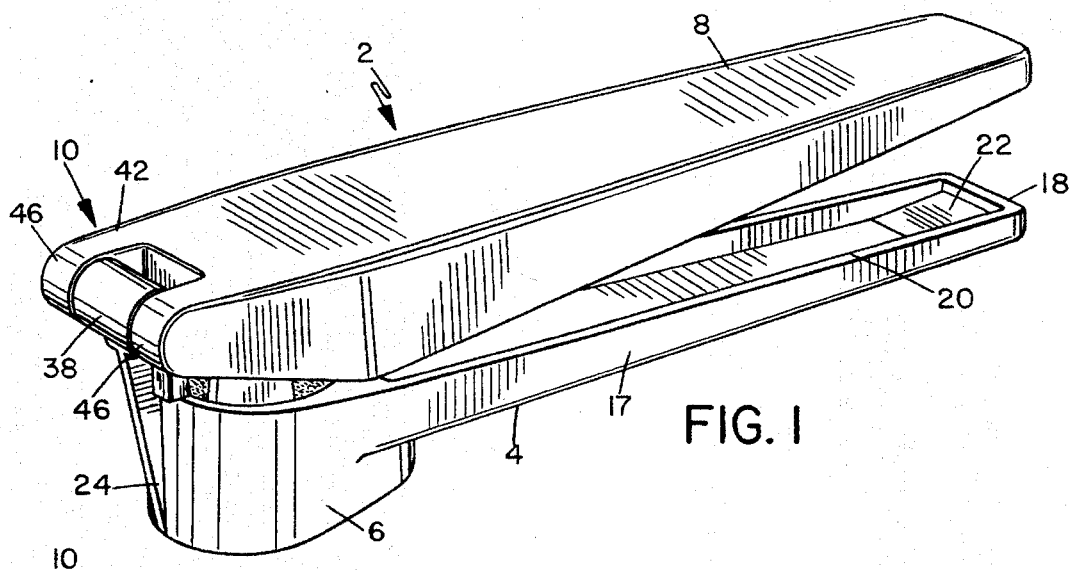
FIG. 1 is a perspective view of one embodiment of the garlic press of this invention.

The press 2 is illustrated generally in FIG. 1. It consists of four principal components: the base 4 containing at one end the clove container 6, the lever 8 which is hinged to the base 4 at fulcrum 10, the press bar 12, which is hinged to the lever 8 at pivot 14, and the detachable cleaner 16, which is housed in the lever 8 in a manner which will be described below.

Figure 2:
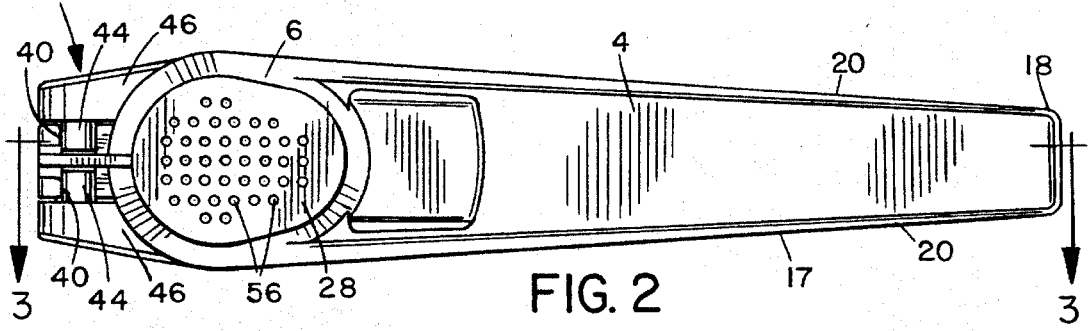
FIG. 2 is a bottom plan view of the press of FIG. 1.
Figure 4:
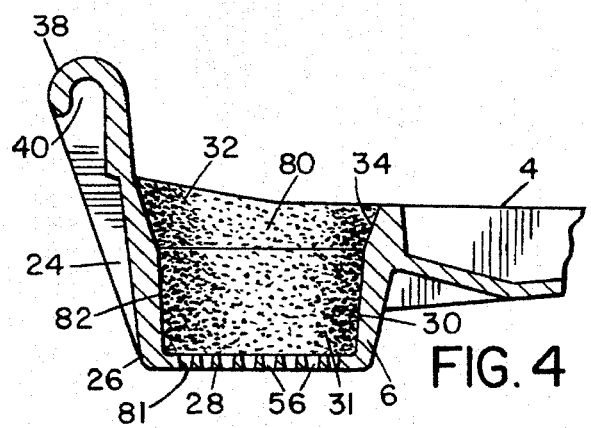
FIG. 4 is a cross-sectional view similar to a portion of FIG. 3, with the upper structure removed to illustrate the configuration of the clove container.
Figure 5:
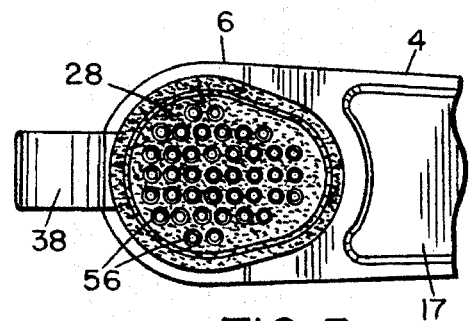
FIG. 5 is a top plan view of the structure of FIG. 4.

The base 4 comprises an elongated handle 17 of sufficient length for a user to grasp it easily in the hand. Typically the handle length from the edge of the clove container 6 to the terminal end 18 will be about 4" (10 cm). The handle is convenient formed of flat stock with upturned edges 20 to provide stiffness. The end portion 18 can include a fillet 22 for additional stiffening. At the end 24 of the handle opposite end 18 is clove container 6. Clove container 6 is integrated into the handle 4 with a portion 26 extending below the handle 4 and terminating in sieve 28 which forms the bottom of the container 6. The entire container 6 has a generally rounded cross-section (best seen in FIGS. 2 and 5) and is of an internal diameter sufficiently large to hold at least one complete clove of garlic. The container 6 has a slight taper 30 downward to sieve 28 (best seen in FIGS. 3, 4 and 6), and in the embodiment shown also has an entry section 32 of the container 6 which has a somewhat wider taper 34. The container 6 commonly has a minimum diameter at the sieve 28 of about ¾" (2 cm). In the typical example shown in the Figures, the sieve 28 is ovoid in shape and has axial dimensions of about ¾"×1" (2.0×2.6 cm) and a depth between transition 36 and sieve 28 of about ⅝" (1.5 cm). Variations of these dimensions may readily be used.

At the end 24 the wall of container 6 extends upwardly to form a loop 38 having two aligned interior recesses 40. Lever 8 is an elongated member generally similar in shape and length to handle 4. At its end 42 it is configured into two parallel spaced apart arms 46 on the interior side of which are located projection pins 44. Each pin 44 is journaled for rotation in a respective recess 40 and together the pins and recesses form fulcrum 10 around which lever 8 acts.

Figure 6:
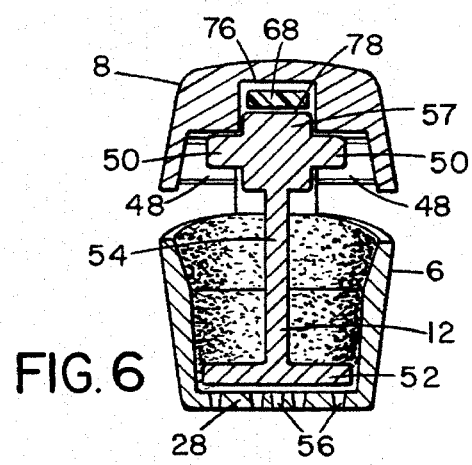
FIG. 6 is a cross-sectional view taken on line 6—6 of FIG. 3.

Within lever 8 and opposite clove container 6 is are a pair of brackets 48 extending inwardly from the outer edges of lever 8. Journaled within each bracket 48 is a pivot pin 50 which is mounted at the top of press bar 12, and on which press bar 12 pivots. Press bar 12 comprises press foot 52 and flange 54; pins 50 are attached to head 57 of flange 54 (as seen in FIG. 6). Downward movement of lever 8 forces press bar 12 into container 6 to press a garlic clove (not shown). The liquid expressed from the pressed clove drains out of container 6 through the drain holes 56 in sieve 28. The device 2 thus functions as a second class lever. When the clove is crushed and the liquid fully extracted, lever 8 is lifted and pivots away from base 4 on fulcrum 10, withdrawing press bar 12 from container 6. The bulk of the clove residue can then be readily removed from the container 6 and a fresh clove inserted if desired.

Figure 3:
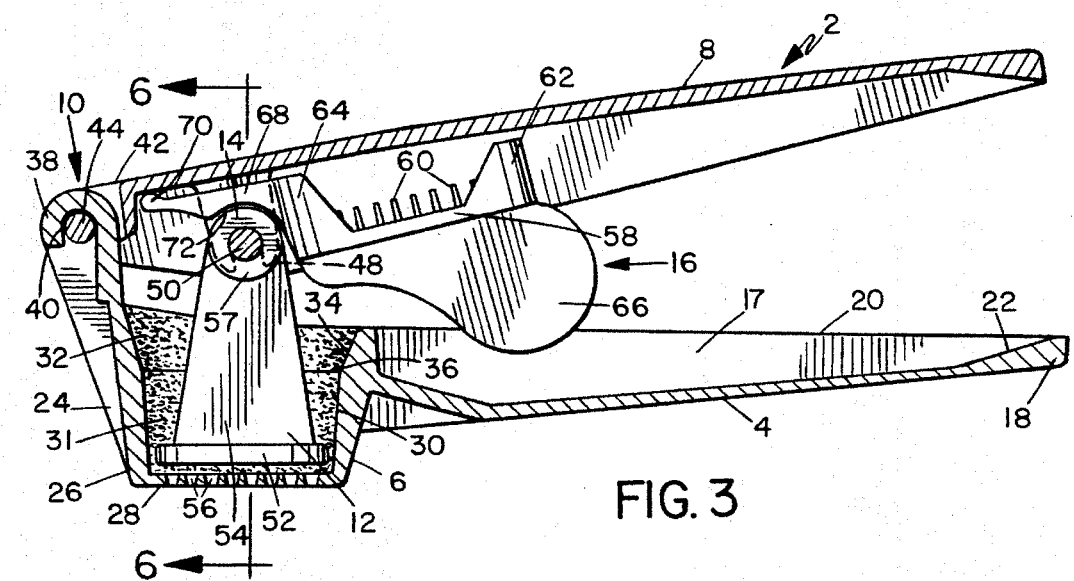
FIG. 3 is a cross-sectional view taken on line 3—3 of FIG. 2.
Figure 7:
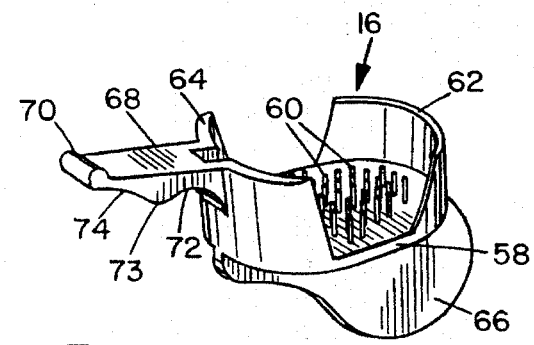
FIG. 7 is a perspective view of the cleaning device.
Figure 8:
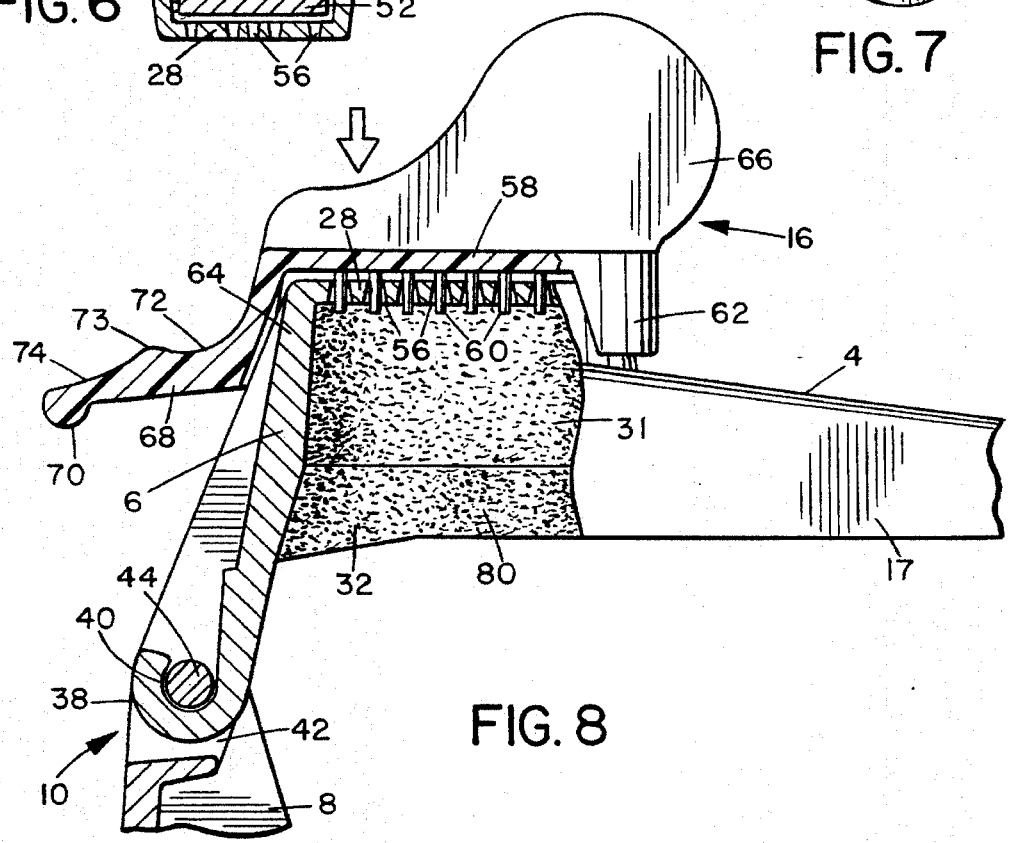
FIG. 8 is an enlarged side view, partially cut away, illustrating the method of use of the cleaning device.

It is common, however, for some portion of the clove residue to remain in one or more of the holes 56 and not be freed and removed along with the bulk of the clove residue when the press bar 12 is withdrawn and the press 2 inverted and shaken. In the present device a unique cleaner 16 is incorporated to clear remaining residue from the holes 56. The cleaner 16 is best illustrated in FIGS. 3, 7 and 8. It has a base 58 from which a plurality of pegs 60 protrude. The number and layout of the pegs 60 corresponds to the number and layout of holes 56, so that when used the cleaner 16 can clear all holes 56 of residue simultaneously, as illustrated in FIG. 8. The cleaner also has guide walls 62 and 64 which align it with the clove container 6 so that when used the alignment of the pegs 60 and holes 56 is essentially automatic. A broad grip 66 is attached to the back of base 58 to provide a surface for the user to grip the cleaner 16. An attachment arm 68 is connected to the forward side of wall 64 to allow the cleaner 16 to be releasably stowed within the device 2 to keep it handy when not in use. The arm 68 is sized to fit between the underside 76 of lever 8 and the top 78 of the head 57, as best illustrated in FIGS. 3 and 6. The arm contains recess 72 which engages the underside 78 of pivot 50, and extension 74 which ends in spacer 70. Spacer 70 causes a slight wedging action through extension 74 acting against the underside 76 of lever 8 which retains the cleaner 16 in its stowed position, but extension 74 is sufficiently flexible that cleaner 16 can readily be withdrawn from its stowed position for use. Between recess 72 and extension 74 is detent 73, which aids in positioning cleaner 16 in its stowed position.

The interior of container 6 in both the lower portion 31 and the upper portion 32 is lined with an enameled low-friction composition 80 to enable the crushed clove residue to be readily removed from the container 6 after extraction of the clove liquid. The composition 80 normally and preferably extends into the holes 56 and similarly lines the surfaces of the holes. The low-friction coating provided by the composition 80 thus facilitates the crushing of the garlic clove, the collection and discharge of the expressed liquid, and the cleaning of the device following usage.

While some prior art devices have been coated to some extent, such coatings have not been satisfactorily adhered to the interior surface 82 or holes 56 of the container 6. The prior art compositions have merely been sprayed or painted on, which has made them susceptible to flaking, peeling, chipping or otherwise being removed from the surface 82 by use of the press 2. In the present invention the coating composition 80 is a high-temperature-melting composition which is adhered to the interior surface 82 by enameling at high temperature, to form a strong, highly adherent bond between the surface 82 and the composition 80. A preferred material for composition 80 is polytetrafluoroethylene [PTFE: $(C_2F_4)_n$], which has a melting point of 620° F. (327° C.) and a processing temperature of 600° F. (316° C.). It is hydrophobic and has a water absorption of no more than 0.01%, which makes it readily cleanable and ideal as a kitchen utensil coating, since it does not absorb or harbor unwanted liquid residues. As a coating it has an exceptionally low coefficient of friction ($\mu = 0.005$–$0.04$).

PTFE is normally enameled onto the surface 82 from an aqueous dispersion, typically having 45–50% PTFE and 6–9% of a nonionic wetting agent. The dispersion is coated onto the surface 82 and then dried at about 185°–205° F. (85°–96° C.). Thereafter the dried coating is baked and sintered to remove the wetting agent and enamel the PTFE onto the surface 82. Baking is at 500°–600° F. (260°–316° C.) and the subsequent sintering is at 680°–752° F. (360°–400° C.), each for a few seconds up to a few minutes, depending on the thickness of the coating desired. Normally the coating will be no more than 1 mm thick, and can be applied in a single drying/baking/sintering enameling process. If thicker coatings are desired, they are preferably built up by successive enameling applications of this layers rather than by enameling a thick layer all at once. Further, the coating of the present invention can be built up as multiple applications of thinner coating layers if so desired. The properties of PTFE and suitable enamelling methods are described in Seymour, *Engineering Polymer Handbook*, (1990), chapter 15; Sperati, "Fluorocarbon Polymers, Polytetrafluoroethylene (PTFE)", chapter 12 in Rubin, ed., *Handbook of Plastic Materials and Technology* (1990); Harper, ed., *Handbook of Plastics, Elastomers, and Composites* (2nd edn.: 1992), chapters 1 and 8; and Licardi, *Plastic Coatings for Electronics* (1970), chapter 2. It is contemplated that other polymers which have thermal and friction properties generally equivalent to PTFE will also be suitable as the enameled coating 80.

The various parts of the device may conveniently be made from cast or sheet metals or high density rigid plastic materials. Since the clove container is to be enamelled with the PTFE or similar coating, the handle 4 and its incorporated container 6 must be made of a material, such as cast metal, which will withstand the elevated temperatures of the enamelling step. Conventional casting, moulding or sheet forming processes may be used to form the parts of the device.

It will be evident from the above that there are numerous embodiments of the present invention which, while not expressly described above, are clearly within the scope and spirit of the invention. Therefore the above description is to be considered exemplary only, and the actual scope of the invention is to be determined solely by the appended claims.

I claim:

1. A garlic press comprising an elongated handle having a drainable press chamber at an end thereto, said press chamber having a top opening, a bottom and an inner surface, a press plate retractably moveable into said press chamber, lever means acting on a fulcrum at said end for retractably urging said press plate into said press chamber through said top opening, said press plated being joined to said lever by a pivot, a low surface friction material enameled onto said inner surface of said press chamber, and a cleaner mounted on said lever and removably secured thereto by interaction with said pivot, whereby when a clove of garlic is placed in said press chamber, its contained liquid can be extracted by said clove being cleanly crushed by said press plated being urged into said chamber by said lever, liquid so expressed drains from said chamber and following said crushing and liquid expression said cleaner can be demounted from said lever and used to dislodge debris of said crushed clove.

2. A garlic press as in claim 1 wherein said press chamber has a plurality of holes in said bottom for drainage of said expressed liquid and said cleaner comprises a plate having protruding therefrom a plurality of pegs equal in number and orientation to said plurality of holes and of smaller diameter than said holes, grip means for gripping said cleaner, and extension means for interfitting with said pivot and removably locking thereto, such that following use of said press, a user may grasp said cleaner by said gripping means, remove said cleaner from interfitting with said pivot, and urge said prongs through said holes to dislodge garlic particles from said holes.

3. A garlic press as in claim 2 wherein said low surface friction material also is enameled onto the inside surface of each of said holes.

4. A garlic press as in claim 2 wherein said lever comprises a pair of spaced apart bearings extending therefrom, said pivot comprises an axle journaled in said bearings and journaled through said press plate disposed between said bearings, and said interfitting of said extension means of said cleaner comprises said extension means comprising a wedge having a detent whereby when said wedge is disposed between said axle and said lever, said detent is releasably retained by friction with an upper surface of said press plate.

5. A garlic press as in claim 2 wherein said cleaner comprises a base having a plurality of pegs protruding therefrom, the number and orientation of said plurality of pegs corresponding to the number and orientation of said holes, gripping means for a user to grip said cleaner, and securing means to releasably secure said cleaner to said press.

6. A garlic press as in claim 5 wherein said securing means comprises a flexible extended arm having a detent therein for engaging said press plate maintaining said arm disposed between said press plate and an underside of said lever.

7. A garlic press as in claim 6 wherein said arm terminates at its distal end with a spacer to urge said detent into contact with said press plate.

8. A garlic press as in claim 1 wherein said low surface friction material comprises a fluorocarbon polymer capable of withstanding elevated temperatures.

9. A garlic press as in claim 8 wherein said fluorocarbon polymer is adhered to said inner surface of said press chamber by enameling at said elevated temperatures.

10. A garlic press as in claim 8 wherein said fluorocarbon polymer comprises polytetrafluoroethylene.

11. A garlic press as in claim 1 wherein said lever comprises a second class lever.

12. A cleaner for removing residual garlic particles from the sieve holes of a garlic press after use of said press, which cleaner comprises a plate having protruding therefrom a plurality of pegs equal in number and orientation to said sieve holes and of smaller diameter than said holes, grip meads for gripping said cleaner, and extension means for interfitting with said press and being removably secured thereto, such that following use of said press, a user may grasp said cleaner by said gripping means, remove said cleaner from interfitting with said pivot, and urge said prongs through said holes to dislodge said garlic particles from said holes.

13. A cleaner as in claim 12 further comprising guide walls at least partially surrounding said plate and cooperating with said press for guiding said pegs into and through said holes to remove clove residue therefrom.

14. A cleaner as in claim 12 further comprising an arm mounted thereon which is adapted to interfit with a corresponding recessed portion of said press, said interfitting acting to releasably retain said cleaner secured to said press during use of the latter.

* * * * *